US012656572B2

(12) United States Patent
Weng et al.

(10) Patent No.: US 12,656,572 B2
(45) Date of Patent: Jun. 16, 2026

(54) OPTICAL SYSTEM

(71) Applicant: Actutek Corporation, Taoyuan City (TW)

(72) Inventors: Chih-Wei Weng, Taoyuan City (TW); Chao-Hsi Wang, Taoyuan City (TW); Kuen-Wang Tsai, Taoyuan City (TW); Tzu-Ying Chen, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 505 days.

(21) Appl. No.: 17/502,642

(22) Filed: Oct. 15, 2021

(65) Prior Publication Data

US 2022/0120998 A1 Apr. 21, 2022

Related U.S. Application Data

(60) Provisional application No. 63/108,051, filed on Oct. 30, 2020, provisional application No. 63/092,342, filed on Oct. 15, 2020.

(51) Int. Cl.
*G02B 7/02* (2021.01)
*G02B 1/04* (2006.01)
(Continued)

(52) U.S. Cl.
CPC .............. *G02B 7/04* (2013.01); *G02B 1/041* (2013.01); *G02B 7/00* (2013.01); *G02B 7/003* (2013.01);
(Continued)

(58) Field of Classification Search
CPC . G02B 1/041; G02B 7/04; G02B 7/00; G02B 7/003; G02B 7/006; G02B 26/04;
(Continued)

(56) References Cited

U.S. PATENT DOCUMENTS

| | | | | | |
|---|---|---|---|---|---|
| 3,162,110 | A | * | 12/1964 | Miessen | G03B 9/08 |
| | | | | | 396/298 |
| 2010/0014172 | A1 | * | 1/2010 | Koyama | G03B 7/02 |
| | | | | | 359/739 |

(Continued)

FOREIGN PATENT DOCUMENTS

| | | |
|---|---|---|
| CN | 1115391 A | 1/1996 |
| CN | 1723408 A | 1/2006 |

(Continued)

OTHER PUBLICATIONS

Office Action for CN Application No. 202111204905.7 dated Jul. 29, 2025 is attached (8 pages).

*Primary Examiner* — Mahidere S Sahle
(74) *Attorney, Agent, or Firm* — MUNCY, GEISSLER, OLDS & LOWE, P.C.

(57) ABSTRACT

An optical system is provided in the present disclosure, including a fixed portion and a movable portion. The movable portion is movable relative to the fixed portion. The movable portion includes an optical adjustment assembly and a first optical element. The optical adjustment assembly has a frame and an optical axis. The first optical element has a first housing, which is connected to the frame of the optical adjustment assembly. The first optical element and the optical adjustment assembly are arranged along the optical axis.

19 Claims, 3 Drawing Sheets

10

(51) Int. Cl.

| | |
|---|---|
| *G02B 7/00* | (2021.01) |
| *G02B 7/04* | (2021.01) |
| *G02B 26/04* | (2006.01) |
| *G03B 9/02* | (2021.01) |
| *G03B 9/08* | (2021.01) |
| *G03B 9/36* | (2021.01) |
| *G03B 11/00* | (2021.01) |

(52) U.S. Cl.
CPC ............. *G02B 7/006* (2013.01); *G02B 26/04* (2013.01); *G03B 9/02* (2013.01); *G03B 9/08* (2013.01); *G03B 9/36* (2013.01); *G03B 11/00* (2013.01)

(58) Field of Classification Search
CPC ... G03B 9/02; G03B 9/08; G03B 9/36; G03B 11/00
USPC .................. 359/694–706, 738–740, 811–830
See application file for complete search history.

(56) References Cited

U.S. PATENT DOCUMENTS

| | | | | |
|---|---|---|---|---|
| 2011/0043936 A1* | 2/2011 | Mori | ...................... | G02B 7/282 |
| | | | | 359/825 |
| 2020/0319533 A1* | 10/2020 | Cugini | ................... | G02B 7/006 |
| 2022/0291474 A1* | 9/2022 | Takita | ...................... | G03B 9/22 |

FOREIGN PATENT DOCUMENTS

| | | | | | | |
|---|---|---|---|---|---|---|
| CN | 2757154 | Y | | 2/2006 | | |
| CN | 108873222 | A | * | 11/2018 | .............. | G02B 7/00 |
| CN | 109324380 | A | | 2/2019 | | |
| JP | 2003035854 | A | | 2/2003 | | |
| WO | WO-2016199899 | A1 | * | 12/2016 | .............. | G03B 9/06 |

* cited by examiner

10B

OPTICAL SYSTEM

CROSS REFERENCE TO RELATED APPLICATIONS

This application claims the benefit of U.S. Provisional Application No. 63/092,342, filed Oct. 15, 2020, and U.S. Provisional Application No. 63/108,051, filed Oct. 30, 2020, the entirety of which are incorporated by reference herein.

BACKGROUND OF THE INVENTION

Field of the Invention

The present disclosure relates to an optical system, and more particularly to an optical system utilizing double-injection molding technology.

Description of the Related Art

As technology has developed, it has become more common to include image-capturing and video-recording functions into many types of modern electronic devices, such as notebooks computers, smartphones, and digital cameras. These electronic devices are used more and more often. In addition to the new models that have been developed to be more convenient, thin, and lightweight, it is also desirable to provide optical qualities that are more stable and better, offering more choices for consumers.

Electronic devices that have image-capturing or video-recording functions normally include one or more lenses, thereby performing such functions as auto focus (AF), zooming, and/or optical image stabilization (OIS). However, high temperature is often used for curing the adhesive glue when attaching the barrel outside of the lenses to other components (e.g. apertures, holders, driving mechanisms, etc.). This high temperature leads to thermal expansion, thus resulting in deformation between the barrel and other components, so that the lenses inside the barrel may shift, affecting the optical resolution. As a result, the present disclosure provides an optical system that is different from the prior art, to enhance its optical quality without affecting the overall structural strength of the optical system.

BRIEF SUMMARY OF THE INVENTION

In one embodiment of the present disclosure, an optical system includes a fixed portion and a movable portion. The movable portion is movable relative to the fixed portion. The movable portion includes an optical adjustment assembly and a first optical element. The optical adjustment assembly has a frame and an optical axis. The first optical element has a first housing, which is connected to the frame of the optical adjustment assembly. The first optical element and the optical adjustment assembly are arranged along the optical axis.

In some embodiments of the present disclosure, the frame includes a first body and a first connecting portion. The first body has a first material. The first connecting portion has a second material. The first material and the second material are different. In some embodiments, the coefficient of thermal expansion of the first material and the coefficient of thermal expansion of the second material are different.

In some embodiments of the present disclosure, the first body, the first connecting portion and the first housing of the first optical element at least partially overlap when viewed in a direction that is perpendicular to the optical axis.

In some embodiments of the present disclosure, the first housing has a third material. The third material is similar to the second material. In some embodiments, the coefficient of thermal expansion of the third material is similar to the coefficient of thermal expansion of the second material.

In some embodiments of the present disclosure, the optical system further includes an adhesive element. There is a gap between the first housing and the first connecting portion. The adhesive element is disposed inside the gap, so that the first housing is fixedly connected to the first connecting portion.

In some embodiments of the present disclosure, the adhesive element has a fourth material. The coefficient of thermal expansion of the fourth material is similar to the coefficient of thermal expansion of the second material.

In some embodiments of the present disclosure, the first material includes plastic material and the second material includes plastic material.

In some embodiments of the present disclosure, the first material includes plastic material and the second material includes metal material. In some embodiments, the coefficient of thermal expansion of the metal material included in the second material is close to zero.

In some embodiments of the present disclosure, the movable portion further includes a second optical element and a holder. The second optical element has a second housing. The holder is connected to the second housing.

In some embodiments of the present disclosure, the holder includes a second body and a second connecting portion. The second body has a fifth material. The second connecting portion has a sixth material. The fifth material and the sixth material are different. In some embodiments, the coefficient of thermal expansion of the fifth material and the coefficient of thermal expansion of the sixth material are different.

In some embodiments of the present disclosure, the second housing has a seventh material. The seventh material is similar to the sixth material. In some embodiments, the coefficient of thermal expansion of the seventh material is similar to the coefficient of thermal expansion of the sixth material.

In some embodiments of the present disclosure, the sixth material is similar to the second material. In some embodiments, the coefficient of thermal expansion of the sixth material is similar to the coefficient of thermal expansion of the second material.

In some embodiments of the present disclosure, the fifth material includes plastic material and the sixth material includes metal material. In some embodiments, the coefficient of thermal expansion of the metal material included in the sixth material is close to zero.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
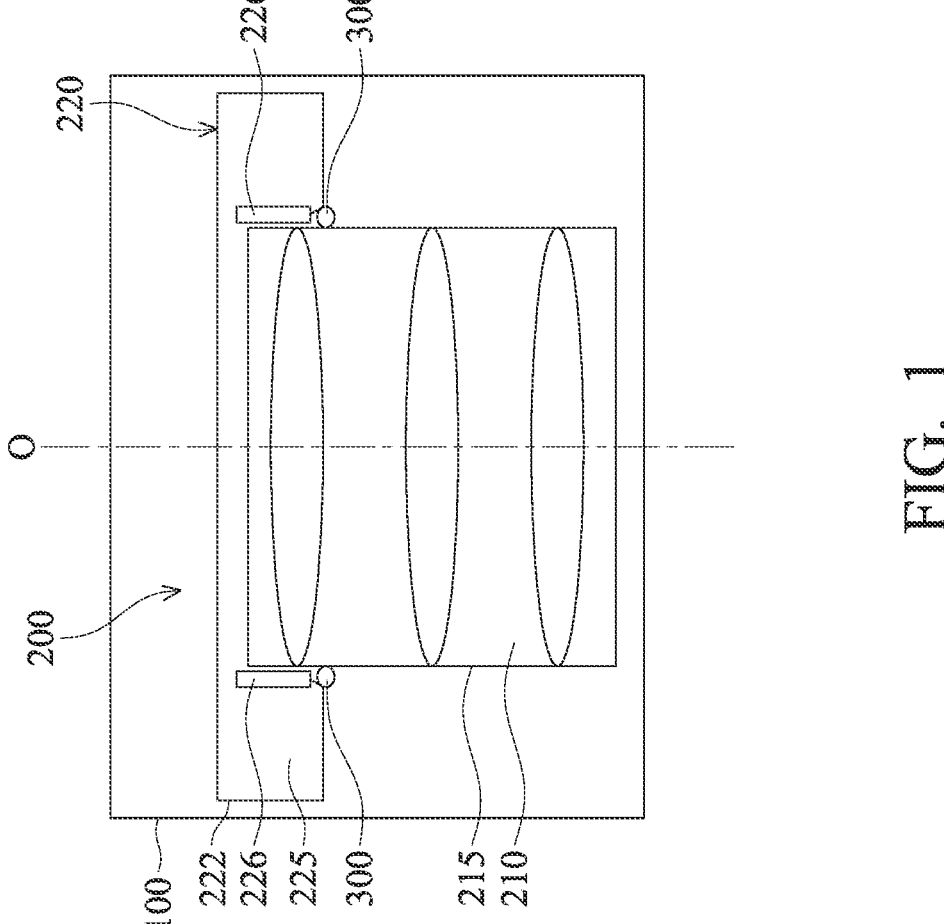
FIG. 1 is a schematic view of the optical system, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and; or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical system is provided in the present disclosure. The optical system includes one or more optical elements and at least one component that is attached to the optical element, such as a holder, an optical adjustment assembly, or a driving assembly, or the like. By using the double-injection molding technology, the component that is attached to the optical element at least includes two materials. In addition, the connecting portion of the component to the optical element has a similar material (e.g. has a similar coefficient of thermal expansion) as the exterior housing of the optical element. As a result, the internal structure of the optical element (e.g. one or more lenses included therein) is prevented from shifting due to thermal expansion when the component and the optical element are exposed to high temperature, thereby maintaining a good optical resolution.

First, referring to FIG. 1, FIG. 1 is a schematic view of the optical system 10, according to some embodiments of the present disclosure. As shown in FIG. 1, the optical system 10 mainly includes a fixed portion 100 and a movable portion 200. The movable portion 200 is movably disposed in the fixed portion 100. In some embodiments, the movable portion 200 may be connected to a driving assembly (not shown) for driving the movable portion 200 to move relative to the fixed portion 100. In the embodiment shown in FIG. 1, the movable portion 200 includes a first optical element 210 and an optical adjustment assembly 220. In some embodiments, the first optical element 210 may be a barrel with one or more lenses disposed therein, for example. In the embodiment illustrated in FIG. 1, three lenses are disposed in the first optical element 210, but the number of the lenses is not intended to be limiting. In some other embodiments, there may be a suitable number of lenses that are disposed in the first optical element 210 to achieve desirable optical effects. In some embodiments, the first optical element 210 has a first housing 215, and the optical adjustment assembly 220 has a frame 222 and an optical axis O. The first housing 215 is connected to the frame 222 of the optical adjustment assembly 220. In some embodiments, the optical adjustment assembly 220 may be an aperture, for example, for adjusting the quantity of light that enters the optical system 10. As shown in FIG. 1, the first optical element 210 and the optical adjustment assembly 220 are arranged along the optical axis O.

In some embodiments, the frame 222 of the optical adjustment assembly 220 includes a first body 225 and a first connecting portion 226. The first connecting portion 226 is located on a side that is closer to the first optical element 210. In some embodiments, the first body 225 and the first connecting portion 226 are formed simultaneously by using the double-injection molding technology, so that the first body 225 and the first connecting portion 226 are integrated together. The frame 222 of the optical adjustment assembly 220 is connected to the first housing 215 of the first optical element 210 via the first connecting portion 226. When viewed in a direction that is perpendicular to the optical axis O, the first body 225, the first connecting portion 226, and the first housing 215 of the first optical element 210 at least partially overlap.

In some embodiments of the present disclosure, the first body 225 has a first material, the first connecting portion 226 has a second material, and the first housing 215 has a third material. In some embodiments, the first material and the second material are different (e.g. the coefficient of thermal expansion of the first material and the coefficient of thermal expansion of the second material are different). In some embodiments, the first material of the first body 225 may include a plastic material, such as liquid-crystal polymer (LCP), or the like. In some embodiments, the third material of the first housing 215 may include a plastic material, such as polycarbonate (PC), or the like. The second material of the first connecting portion 226 may be chosen to be the material that is similar to or the same as the third material. In some embodiments, the definition of the similar or the same materials is that the coefficients of thermal expansion of the second material and the third material are similar or the same. That is, the first housing 215 and the first connecting portion 226 may have similar or the same coefficients of thermal expansion, preventing the internal structure (e.g. one or more lenses) of the first optical element 210 from shifting due to deformation caused by thermal expansion, thereby maintaining good optical resolution.

In some embodiments, the optical system 10 further includes an adhesive element 300 that is disposed inside a gap between the first housing 215 and the first connecting portion 226. The first housing 215 is fixedly connected to the first connecting portion 226 via the adhesive element 300. As such, the first optical element 210 is fixedly connected to the optical adjustment assembly 220, and may move relative to the fixed portion 100 together. In some embodiments, the adhesive element 300 has a fourth material. The fourth material may be glue, such as ultraviolet rays (UV) resin, thermosetting glue, or the like. It should be noted that the coefficient of thermal expansion of the fourth material of the adhesive element 300 may be similar to or the same as the coefficients of thermal expansion of the second material of the first connecting portion 226 and the third material of the first housing 215. In some other embodiments, the optical system 10 may not include an adhesive element 300 (those embodiments without the adhesive element 300 are not illustrated in the present disclosure). In such embodiments, the first housing 215 and the first connecting portion 226 may be secured by a hot melt structure.

In some embodiments, the first material of the first body 225 includes plastic material, and the second material of the first connecting portion 226 also includes plastic material (e.g. polycarbonate, or the like). In some other embodiments, the first material of the first body 225 includes plastic material, while the second material of the first connecting portion 226 may include metal material (e.g. special metal material whose coefficient of thermal expansion is close to zero). It should be noted that, no matter whether the second material of the first connecting portion 226 is plastic or metal, the internal lenses of the first optical element 210 may not be influenced by the deformation caused by thermal expansion.

Figure 2:
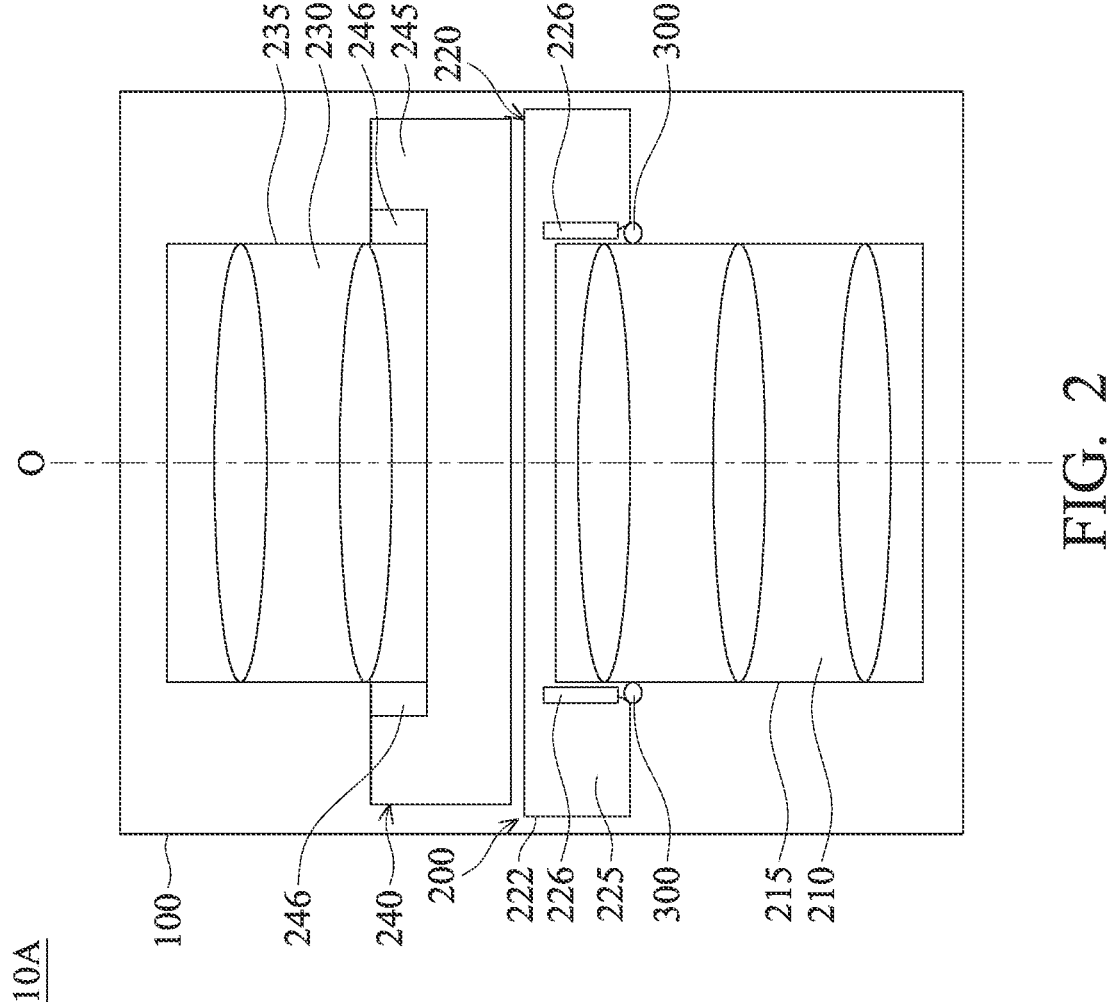
FIG. 2 is a schematic view of the optical system, according to some other embodiments of the present disclosure.

Next, referring to FIG. 2, FIG. 2 is a schematic view of the optical system 10A, according to some other embodiments of the present disclosure. As shown in FIG. 2, the optical system 10A mainly includes a fixed portion 100 and a movable portion 200 that is movable relative to the fixed portion 100. What is different from the optical system 10 illustrated in FIG. 1 is that, the movable portion 200 of the optical system 10A includes first optical element 210, an optical adjustment assembly 220, a second optical element 230 and a holder 240. The arrangements and the structures of the first optical element 210 and the optical adjustment assembly 220 of the optical system 10A are similar) those in FIG. 1, and thus they are not repeated herein. In the embodiment of the FIG. 2, the second optical element 230 is disposed on another side of the first optical element 210. For example, the first optical element 210 may be closer to the light emitting side of the optical system 10A, and the second optical element 230 may be closer to the light incidence side of the optical system 10A. Similar to the first optical element 210, the second optical element 230 may be a barrel with one or more lenses disposed therein, for example. In the embodiment illustrated in FIG. 2, two lenses are disposed in the second optical element 230, but the number of the lenses is not intended to be limiting. In some other embodiments, there may be a suitable number of lenses that are disposed in the second optical element 230 to achieve desirable optical effects. In some embodiments, the second optical element 230 has a second housing 235. The second housing 235 is connected to the holder 240. As shown in FIG. 2, the first optical element 210, the optical adjustment assembly 220, the second optical element 230, and the holder 240 are arranged along the optical axis O.

In some embodiments, the holder 240 includes a second body 245 and a second connecting portion 246. The second connecting portion 246 is located on a side that is closer to the second optical element 230. In some embodiments, the second body 245 and the second connecting portion 246 are formed simultaneously by using the double-injection molding technology, so that the second body 245 and the second connecting portion 246 are integrated together. The holder 240 is connected to the second housing 235 of the second optical element 230 via the second connecting portion 246. When viewed in a direction that is perpendicular to the optical axis O, the second body 245, the second connecting portion 246, and the second housing 235 of the second optical element 230 at least partially overlap.

In some embodiments of the present disclosure, the second body 245 has a fifth material, the second connecting portion 246 has a sixth material, and the second housing 235 has a seventh material. In some embodiments, the fifth material and the sixth material are different (e.g. the coefficient of thermal expansion of the fifth material and the coefficient of thermal expansion of the sixth material are different). In some embodiments, the fifth material of the second body 245 may include a plastic material, such as liquid-crystal polymer (LCP), or the like. In some embodiments, the seventh material of the second housing 235 may include a plastic material, such as polycarbonate (PC), or the like. The sixth material of the second connecting portion 246 may be chosen to be the material that is similar to or the same as the seventh material. In some embodiments, the definition of the similar or the same materials is that the coefficients of thermal expansion of the sixth material and the seventh material are similar or the same. That is, the second housing 235 and the second connecting portion 246 may have similar or the same coefficients of thermal expansion, preventing the internal structure (e.g. one or more lenses) of the second optical element 230 from shifting due to deformation caused by thermal expansion, thereby maintaining good optical resolution.

In some embodiments, the fifth material of the second body 245 includes plastic material, and the sixth material of the second connecting portion 246 also includes plastic material (e.g. polycarbonate, or the like). In some other embodiments, the fifth material of the second body 245 includes plastic material, while the sixth material of the second connecting portion 246 may include metal material (e.g. special metal material whose coefficient of thermal expansion is close to zero). It should be noted that, no matter whether the second material of the second connecting portion 246 is plastic or metal, the internal lenses of the second optical element 230 may not be influenced by the deformation caused by thermal expansion.

It should be noted that, in some embodiments, the sixth material of the second connecting portion 246 may be similar to or the same as the second material of the first connecting portion 226. That is, the coefficients of thermal expansion of the sixth material and the second material may be similar or the same. Furthermore, the second material, the third material, the sixth material, and the seventh material may have similar or the same coefficients of thermal expansion, preventing the optical elements from being influenced by the deformation caused by thermal expansion.

In addition, the connecting method between the second optical element 230 and the holder 240 is similar to the connecting method between the first optical element 210 and the optical adjustment assembly 220, such as via an adhesive element or by a hot melt structure, and thus it is not repeated.

Figure 3:
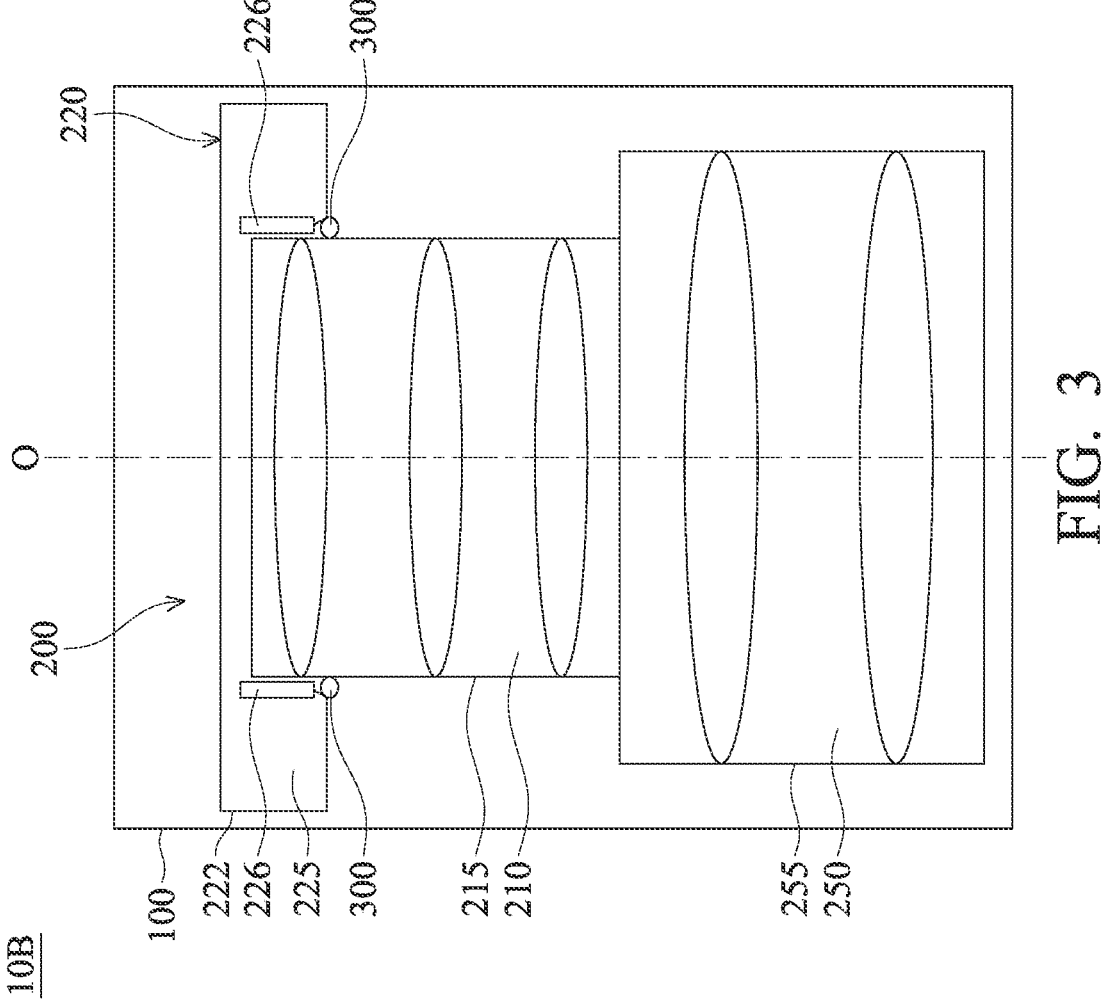
FIG. 3 is a schematic view of the optical system, according to yet some other embodiments of the present disclosure.

Next, referring to FIG. 3, FIG. 3 is a schematic view of the optical system 10B, according to yet some other embodiments of the present disclosure. As shown in FIG. 3, the optical system 10B mainly includes a fixed portion 100 and a movable portion 200 that is movable relative to the fixed portion 100. What is different from the optical system 10 illustrated in FIG. 1 is that, the movable portion 200 of the optical system 10B includes a first optical element 210, an optical adjustment assembly 220, and a third optical element 250. The arrangements and the structures of the first optical element 210 and the optical adjustment assembly 220 of the optical system 10B are similar to those in FIG. 1 and thus they are not repeated herein. In the embodiment of the FIG. 3, the third optical element 250 is disposed on another side of the first optical element 210 from the optical adjustment assembly 220. For example, the optical adjustment assembly 220 may be disposed on the light incidence side of the first optical element 210, and the third optical element 250 may be disposed on the light emitting side of the first optical element 210. Similar to the first optical element 210, the third optical element 250 may be a barrel with one or more lenses disposed therein, for example. In the embodiment illustrated in FIG. 3, two lenses are disposed in the third optical element 250, but the number of the lenses is not intended to be limiting. In some other embodiments, there may be a suitable number of lenses that are disposed in the third optical element 250 to achieve desirable optical effects. In some embodiments, the third optical element 250 has a third housing 255. The third housing 255 is connected to the first housing 215 of the first optical element 210. As shown in FIG. 3, the first optical element 210, the optical adjustment assembly 220, and the third optical element 250 are arranged along the optical axis O.

In some embodiments, the third housing 255 of the third optical element 250 may have an eighth material. In some embodiments, the eighth material may include a plastic material, such as polycarbonate (PC), or the like, which is similar to or the same as the third material of the first housing 215. In some embodiments, the definition of the similar or the same materials is that the coefficients of thermal expansion of the eighth material and the third material are similar or the same. That is, the third housing 255 and the first housing 215 may have similar or the same coefficients of thermal expansion, preventing the internal structures (e.g. one or more lenses) of the first optical element 210 and the third optical element 250 from shifting due to deformation caused by thermal expansion, thereby maintaining good optical resolution.

It should be noted that the positions of the optical adjustment assembly 220 illustrated in the figures of the present drawing are not intended to be limiting. The optical adjustment assembly 220 may be placed in any suitable location in the optical system based on the desirable optical effect by users. For example, the optical adjustment assembly 220 may be placed in a location that is closer to the light incidence side than any other optical elements in the optical system. Alternatively, the optical adjustment assembly 220 may be placed in a location that is closer to the light emitting side than any other optical elements in the optical system. Alternatively, the optical adjustment assembly 220 may be placed between multiple optical elements. That is, there may be one or more optical elements disposed in front of the optical adjustment assembly 220 (that is closer to the light incidence side), and there may be one or more optical elements disposed in the back of the optical adjustment assembly 220 (that is closer to the light emitting side) as well.

In addition, as previously mentioned, in some embodiments of the present disclosure, the movable portion 200 may be connected to a driving assembly (not shown) that may drive the movable portion 200 to move relative to the fixed portion 100, achieving optical image stabilization (OIS). A connecting portion that is similar to the first connecting portion 226 or the second connecting portion 246 may also be disposed where the driving assembly is connected to the movable portion 200 (e.g. to the first optical element 210). In other words, the driving assembly may have similar or the same material as the second material, the third material, the sixth material, the seventh material, and the eighth material formed where it is connected to the movable portion 200 by using the double-injection molding technology, thus having a similar or the same coefficient of thermal expansion. As a result, the optical system would not be affected by the deformation caused by thermal expansion when it is exposed to high temperature, and the resolution of images may be improved.

In summary, the components (e.g. the optical adjustment assembly 220, the holder 240, the driving assembly, etc.) that is attached to one or more optical elements (e.g. the first optical element 210, the second optical element 230, or the third optical element 250, etc.) may have at least two different materials by using the double-injection molding technology. Moreover, the material of the component where it is connected to the optical element may be similar (e.g. having similar coefficients of thermal expansion) to the material of the exterior housing of the optical element. As a result, the internal structure of the optical element (e.g. one or more lenses included therein) is prevented from shifting due to thermal expansion when the optical system 10 (or the optical system 10A or the optical system 10B) is exposed to high temperature. This not only does not affect the structural strength of the optical system itself, but also maintains a good optical resolution.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
   a fixed portion; and
   a movable portion, movable relative to the fixed portion, including:
   an optical adjustment assembly, having a frame and an optical axis; and
   a first optical element, having a first housing connected to the frame of the optical adjustment assembly, wherein the first optical element and the optical adjustment assembly are arranged along the optical axis;
   wherein the frame comprises:
   a first body having a first material; and
   a first connecting portion having a second material, wherein the first material and the second material are different;
   wherein the first body and the first connecting portion are formed integrally by using double-injection molding technology;
   wherein the optical system further comprises an adhesive element, wherein there is a gap between the first housing and the first connecting portion, and the adhesive element is disposed inside the gap, so that the first housing is fixedly connected to the first connecting portion;

wherein the adhesive element has a fourth material, wherein the coefficient of thermal expansion of the fourth material is similar to the coefficient of thermal expansion of the second material.

2. The optical system as claimed in claim 1, wherein the coefficient of thermal expansion of the first material and the coefficient of thermal expansion of the second material are different.

3. The optical system as claimed in claim 1, wherein the first body, the first connecting portion and the first housing of the first optical element at least partially overlap when viewed in a direction that is perpendicular to the optical axis.

4. The optical system as claimed in claim 1, wherein the first housing has a third material, wherein the third material is similar to the second material.

5. The optical system as claimed in claim 4, wherein the coefficient of thermal expansion of the third material is similar to the coefficient of thermal expansion of the second material.

6. The optical system as claimed in claim 1, wherein the first material includes plastic material and the second material includes plastic material.

7. The optical system as claimed in claim 1, wherein the first material includes plastic material and the second material includes metal material.

8. The optical system as claimed in claim 7, wherein the coefficient of thermal expansion of the metal material included in the second material is close to zero.

9. The optical system as claimed in claim 1, wherein the movable portion further comprises:

a second optical element, having a second housing; and a holder, connected to the second housing.

10. The optical system as claimed in claim 9, wherein the holder comprises:

a second body having a fifth material; and a second connecting portion having a sixth material, wherein the fifth material and the sixth material are different.

11. The optical system as claimed in claim 10, wherein the coefficient of thermal expansion of the fifth material and the coefficient of thermal expansion of the sixth material are different.

12. The optical system as claimed in claim 10, wherein the second housing has a seventh material, wherein the seventh material is similar to the sixth material.

13. The optical system as claimed in claim 12, wherein the coefficient of thermal expansion of the seventh material is similar to the coefficient of thermal expansion of the sixth material.

14. The optical system as claimed in claim 12, wherein the sixth material is similar to the second material.

15. The optical system as claimed in claim 14, wherein the coefficient of thermal expansion of the sixth material is similar to the coefficient of thermal expansion of the second material.

16. The optical system as claimed in claim 10, wherein the fifth material includes plastic material and the sixth material includes metal material.

17. The optical system as claimed in claim 16, wherein the coefficient of thermal expansion of the metal material included in the sixth material is close to zero.

18. The optical system as claimed in claim 1, wherein the movable portion is connected to a driving assembly that drives the movable portion to move relative to the fixed portion;

wherein the driving assembly has the same material as the second material formed where it is connected to the movable portion.

19. The optical system as claimed in claim 18, wherein the driving assembly is formed by using double-injection molding technology.

* * * * *